United States Patent [19]
Knohl

[11] 3,855,688
[45] Dec. 24, 1974

[54] STAPLING METHOD
[75] Inventor: Friedrich Karl Knohl, Roselle, Ill.
[73] Assignee: Illinois Tool Works Inc., Chicago, Ill.
[22] Filed: Oct. 1, 1973
[21] Appl. No.: 400,748

Related U.S. Application Data
[62] Division of Ser. No. 178,956, Sept. 9, 1971, Pat. No. 3,788,187.

[52] U.S. Cl..................... 29/432, 227/109, 227/120
[51] Int. Cl............................................. B23p 11/00
[58] Field of Search................ 29/432.1, 432, 432.2; 85/23, 49; 227/109 X, 120 X, 136

[56] References Cited
UNITED STATES PATENTS
| 231,979 | 9/1880 | Ball | 29/432.1 |
| 863,184 | 8/1907 | Jaquith | 85/23 UX |
| 2,033,613 | 3/1936 | Crosby | 85/17 X |
| 2,674,149 | 4/1954 | Benson | 85/31 X |
| 2,693,335 | 11/1954 | Kennedy et al. | 85/49 X |
| 2,716,749 | 9/1955 | Timmerbeil | 227/109 |
| 3,348,752 | 10/1967 | Wheble | 227/109 |
| 3,510,043 | 5/1970 | Larson | 227/109 X |

OTHER PUBLICATIONS
American Builder, September 1963, (Page 6).

Primary Examiner—Charlie T. Moon
Attorney, Agent, or Firm—Robert W. Beart; Thomas W. Buckman

[57] ABSTRACT

An attachment system in which a staple and staple diverging means cooperate in such a manner as to flare the penetrating legs of the staple as it enters a workpiece such as gypsum board. The diverging means is first placed in or on the workpiece and thereafter a staple, including a head portion and leg portion, is driven over the diverging means to diverge outwardly the legs of the staple and thereby provide substantial resistance to withdrawal of the staple, and additionally preventing the entering points of the staple from penetrating thru and protruding thru the opposite side of the workpiece.

1 Claim, 12 Drawing Figures

STAPLING METHOD

This is a division, of application Ser. No. 178,956, filed Sept. 9, 1971, now U.S. Pat. No. 3,788,187.

BACKGROUND OF THE INVENTION

The present invention relates to fastening systems in general and, more specifically, systems which are adapted for use in relatively low density workpieces. The use of relatively low density materials, such as gypsum board, wood fiber, particle board and the like, has become popular in modern construction techniques. Heretofore, relatively standard fastening techniques have been used in such construction. One of the disadvantages of standard fasteners, such as nails, screws, or the like, has been the relative inability of such fasteners to resist pull-out forces, due to the relatively weak nature of the construction material. It is also common for the low density material to deteriorate or be crushed upon the installation of these prior art fasteners.

The use of building panels, boards or the like which have one side finished or decorated and have acquired a good degree of commercial acceptance, required a fastening system normally associated with the back of the panel and which will not protrude completely through the decorated side of the panel. This requirement presents additional problems to the above, namely, to obtain the proper pull-out resistance of the fastener used in the system.

Staples or staple-like devices have been suggested for use in construction materials as described above. One example of such a staple-like device is shown in the patent to Kennedy, U.S. Pat. No. 2,693,335. The techniques taught by this patent is not totally acceptable for the high speed, high volume applications necessary in the market place. This patent requires the legs of a staple to be located in a pair of guides in order for the staple to diverge properly. Such attention to proper placement renders this device awkward to the applicator, as well as cumbersome.

In a broad sense, staples per se could not operate effectively in the low density environment described since they normally offer no resistance to pull out, other than the natural friction or resistance between the legs and the material. This natural resistance is minimized in the low density environment.

SUMMARY OF THE INVENTION

It is the object of this invention to provide a fastening system which offers strong pull-out resistance.

It is another object of this invention to provide a fastening system which is adaptable for high volume application in low density wallboard and other similar materials.

Yet another object of the invention is to provide a system of attachment which will provide a large amount of surface area contact between the fastener and interior of the wallboard of limited thickness.

A further object of the invention resides in a provision of staples in a strip form which are to be driven over diverging means, also in a strip form, to attach a second workpiece to a first workpiece of limited thickness.

A further object of the invention is the provision of a fastening system which will not protrude thru the opposing side of a workpiece, including the decorated or printed surface of wallboard products.

Still another object of the invention is to provide a method of attaching articles using a double staple technique in which a pair of unlike staples are fed beneath a driving means which first drives a staple configured to diverge the legs of a succeeding driven staple.

Further objects and advantages of this invention may be accomplished by utilizing a double staple arrangement in which a first staple in the form of a diverging means cooperates with a second staple having relatively wide legs in such a manner as to diverge the legs of the second staple outwardly while limiting the axial insertion of the second staple in the workpiece.

BRIEF DESCRIPTION OF THE DRAWINGS

FIGS. 3–5 describe various embodiments of the invention utilizing staples and anvils in alternating positions along a strip. It should be noted that these embodiments show a maximum distance between the legs 22 of an anvil or diverging means 14 greater than the minimum distance between the legs 18 of the staple 12. The effect of this relationship, shown clearly in FIG. 2, is that the maximum transverse dimension of the anvil or diverging means 14 causes the legs of the staple to be flared outwardly as staple 18 is driven over the anvil and into a workpiece. The thickness of legs 18 is substantially less than the width of the legs. The relatively thin legs 18 of the staple tend to flatten in the workpiece 28 as they are driven over the anvil. This spring-like effect is extremely important when the stapling system is utilized in low density workpieces. Such workpieces do not readily offer resistance to pull-out and need a relatively wide staple leg which penetrates inwardly of the workpiece and is flared outwardly from the vertical position to offer substantial resistance to pull-out.

To obtain a large resistance to pull-out, the staple should provide a large leg surface area to be embedded in the workpiece. Since some applications require that the fastener not protrude from the other side of the workpiece, the leg of a staple must be capable of flexing when driven into a workpiece. The present invention uses the flexible nature of relatively wide legs 18, which may be longer than the thickness of the workpieces 26 and 28, to provide good resistance to pull-out without protruding through opposing surface 29.

Figure 6:
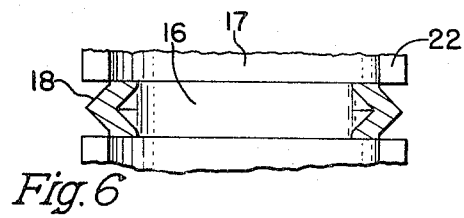
FIGS. 6 and 7 are cross-sectional views taken along line B—B of FIG. 1 showing the configuration of alternate embodiments of the leg design.
Figure 7:
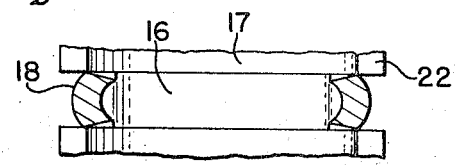

In some instances, it may be necessary to reinforce the staple legs 18. Therefore, FIGS. 6 and 7 show various cross-sectional configurations of the legs 18 which act to reinforce the staple. It should be noted that the reinforcing configuration will also provide cooperating guide channels between the staple 12 and anvil 14.

Figure 2:
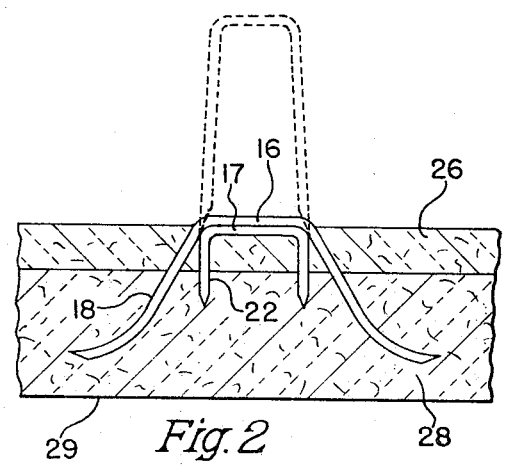
FIG. 2 is a sectional view showing the staple system associated with a pair of workpieces in accordance with the invention.

In operation, the strip 10 is fed in an appropriate driving tool (not shown) and the anvil or diverging means 14 is first driven at least partially into a desired workpiece such as 26 shown in FIG. 2. Thereafter, the strip 10 is further indexed beneath an appropriate driver means and the staple 18 is driven substantially over the head or bridge portion of the anvil 14 in such a manner as to force the legs 18 to diverge, thus forming substantial pull-out resistance. To insure proper positioning, the width of the anvil may be greater than the width of the legs.

The attachment system of the present invention can readily be used in a number of applications. For example, the workpiece 26 could be either a piece of gypsum or other low density material which is to be connected to another workpiece 28 of similar low density qualities. Or the workpiece 26 could conceivably be a shingle or the like which is to be attached to another workpiece 28. It is also contemplated that this system can be utilized to attach a bracket to a low density workpiece. This description is not meant to be restrictive in the type of applications for the system of the present invention and is meant only to be representative of such applications.

Figure 1:
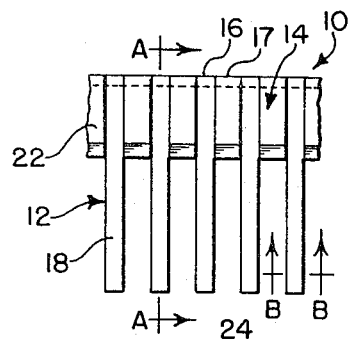
FIG. 1 is a side elevational view of a staple strip including staples and diverging means in alternating positions.
Figure 3:
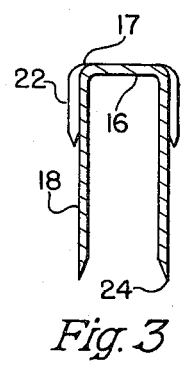
FIGS. 3–5 are cross-sections taken on the line A—A showing three embodiments of the staple-diverging means strip shown in FIG. 1.
Figure 4:
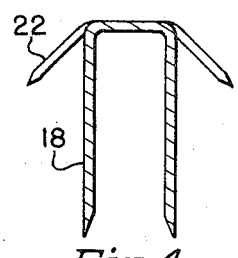
Figure 5:
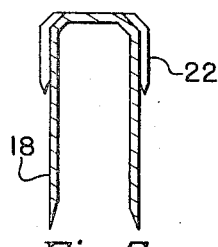
Figure 8:
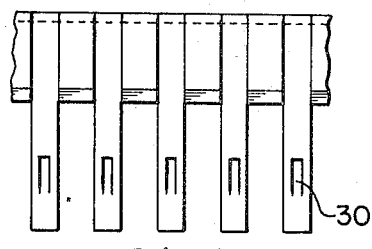
FIG. 8 is a side elevational view of an alternate embodiment of the staple strip of FIG. 1 showing barbs formed in the staple legs.
Figure 9:
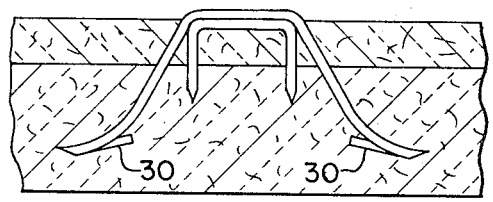
FIG. 9 is a sectional view showing the staple strip in FIG. 8 in an environment similar to that shown in FIG. 2.

FIG. 8 describes an alternate embodiment of the staple strip shown in FIG. 1, wherein barbed or punchouts 30 are formed in the legs 18 of the staple 12. As shown in FIG. 9, these barbs 30 flex inwardly as the terminal or entry end 24 of the staple begins to flatten. The barbs 30, therefore, present further resistance to pull-out of the staple 12.

Figure 11:
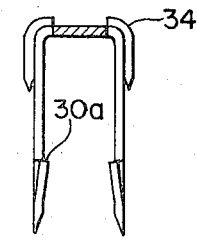
FIG. 11 is a side elevational view of another embodiment of a staple strip in accordance with the invention.
Figure 12:
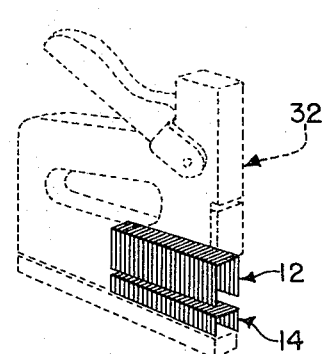
FIG. 12 is a sectional end view of the staple strip of FIG. 11 taken along lines 11—11. Referring now more specifically to the drawings wherein like parts are designated by the same numerals throughout the various figures, a staple strip 10 including staples 12 and anvil or diverging means 14 is shown in FIG. 1. In this preferred embodiment of the invention, the staples 12 are alternatingly positioned along the strip between the anvil portions 14. Both the staple 12 and anvil 14 include head and leg portions represented by 16, 18 and 17, 22 respectively.

Yet a further embodiment of the present invention is shown in FIGS. 11 and 12. Barbs or punched out elements 30a are shown disposed on one edge of the staple leg 18. Anvils 14a are shown alternately placed on a strip between staples 12. The anvil 14a is shown to be of less width than the width of the staple leg 18. This relationship may be accomplished by bending or folding over a portion of anvil 14a on itself. After the anvil 14a is driven into the appropriate workpiece, the staple 18 may thereafter be positioned above the anvil 14a in such a manner as to allow the barb 30a to pass over the anvil without interference from the anvil. The sliding contact between staple leg 18 and anvil 14a may be limited to the area of the legs which does not include the barb 30a to reduce interference from the anvil. The foldover portions 34 of the anvil also act as a further reinforcing means for the anvil, as well as increasing the maximum transverse dimension of the anvil.

Figure 10:
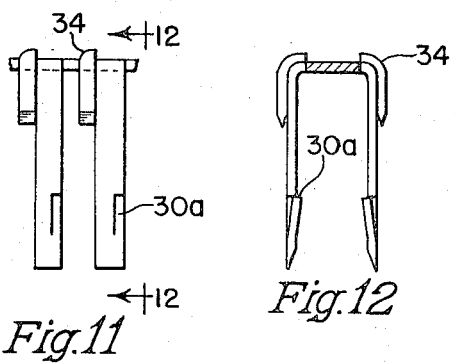
FIG. 10 is a perspective view showing an alternate method of utilizing the double staple technique of the present invention with an appropriate driving instrument in phantom lines.

FIG. 10 shows an alternate configuration of staples and anvils in accordance with the present invention. There is shown two separate staple strips including respectively staples 12 and anvils 14. The staples 12 have the same relatively thin, highly flexible legs as described above. The anvil means 14 are also dimensioned appropriately to provide a maximum transverse dimension which is greater than the minimum distance between the legs of the staple. In this manner, the system may operate similar to that shown in FIGS. 2 and 9. However, in this embodiment, an appropriate driving gun 32, shown in phanton lines, enables the two strips to assume a double-deck configuration. In such a double-deck configuration, the lower strip of anvil means 14 may be first partially driven or associated with an appropriate workpiece followed by forcing or driving of the staple 12 over the head or bridge of the anvil as described above.

While the preferred embodiments of the attachment system and method of attachment have been shown and described herein, it is obvious that many structural details may be changed without departing from the spirit and scope of the appended claims.

I claim:

1. A method for attaching articles to low density material including the steps of positioning, in a single driving tool, a strip of identical staple diverging anvils, each having relatively short penetrating legs, in juxtaposition with a strip of identical staples, each having relatively long flexible legs, alternately driving first an anvil from the strip of anvils into the low density material followed by the driving of a staple over the anvil so as to flare the legs of the staple outwardly without protruding from the opposite side of the material, the anvil and staple thus being driven without moving or repositioning the driving tool.

* * * * *